(12) United States Patent
Savard

(10) Patent No.: US 6,793,598 B1
(45) Date of Patent: Sep. 21, 2004

(54) REAR DERAILLEUR DEVICE FOR A BICYCLE

(75) Inventor: Franck Savard, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/763,507

(22) PCT Filed: Aug. 26, 1998

(86) PCT No.: PCT/FR98/01854

§ 371 (c)(1),
(2), (4) Date: Jul. 25, 2001

(87) PCT Pub. No.: WO00/12379

PCT Pub. Date: Mar. 9, 2000

(Under 37 CFR 1.47)

(51) Int. Cl.[7] .............................................. F16H 61/00
(52) U.S. Cl. ............................ 474/82; 474/80; 474/81
(58) Field of Search .............................. 474/80, 78, 82, 474/81, 79

(56) References Cited

U.S. PATENT DOCUMENTS

| | | | | |
|---|---|---|---|---|
| 3,111,855 A | * | 11/1963 | Juy ............................... | 474/82 |
| 3,364,762 A | * | 1/1968 | Maeda ........................... | 474/82 |
| 3,677,103 A | | 7/1972 | Huret et al. | |
| 4,610,644 A | * | 9/1986 | Nagano ......................... | 474/82 |
| 4,637,808 A | | 1/1987 | Nakamura | |
| 5,904,629 A | * | 5/1999 | Oka .............................. | 474/78 |
| 5,931,753 A | * | 8/1999 | Ichida ........................... | 474/82 |
| 6,135,903 A | | 10/2000 | Savard | |

FOREIGN PATENT DOCUMENTS

| | | | | |
|---|---|---|---|---|
| DE | 42 07 372 | | 9/1993 | |
| EP | 0 657345 | * | 6/1995 | ............ B62M/9/12 |
| EP | 0 727 348 A1 | | 8/1996 | |
| FR | 994 334 | | 11/1951 | |
| FR | 2 037 543 | | 12/1970 | |
| FR | 2 703 020 | | 9/1994 | |
| FR | 2 750 668 | | 1/1998 | |
| FR | 2 759 968 | | 8/1998 | |
| JP | 64-12989 | * | 1/1989 | ............ B62M/9/12 |
| WO | WO 98/01333 A1 | * | 1/1998 | ............ B62M/9/16 |

* cited by examiner

Primary Examiner—Marcus Charles
(74) Attorney, Agent, or Firm—Pearne & Gordon LLP

(57) ABSTRACT

A rear dérailleur device is provided, in particular for a bicycle equipped with a front dérailleur and a chain connecting a set of pinions with a set of disks. The rear dérailleur device includes a rotatable base provided with a return spring forcing the base in the anti-clockwise direction, guiding/dérailleur means fixedly connected with the base, and a movable tension plate fixedly connected with the guiding/dérailleur means.

14 Claims, 6 Drawing Sheets

“REAR DERAILLEUR DEVICE FOR A BICYCLE”

BACKGROUND OF THE INVENTION

1. Field of Invention

The present invention relates to an optimised rear dérailleur device for a bicycle, in particular, however, not exclusively appropriate for bicycles also comprising a front dérailleur and a gearshift system, the unit being controlled by a synchronized control handle.

2. Description of Related Art

An arrangement of two dérailleurs, front and rear, controlled by a single handle is known from the European Patent Application No. 95450012.0.

This arrangement is particularly interesting for the user with regards to riding, however, the particular advantage set forth in the present application, does not represent a direct interest to the user, rather it is the limitation of the chain length.

The fact namely that the number of combinations of the disks and pinions is reduced into a subunit determined by the entirety of combinations corresponding to the product of the number of pinions by the number of disks, is due to the fact that the alignment of the chain is optimised and the length of the chain reduced.

SUMMARY OF THE INVENTION

Moreover, the market requires an improved ground clearance, in particular in the case of off-road bicycles, and it becomes clear that the rear dérailleur is particularly exposed to shocks and to getting caught, in particular when a great chain length has to be taken up.

The dérailleur according to the present invention moreover proposes a dérailleur, the ground clearance of which is considerably increased and the operation of which does not disturb the conception of the bicycle frame so that it can be mounted on the existing bicycle fleet without modification, on condition that a means for limiting the chain crossing is preferably present, so as to reduce the length of the chain, the fabrication of which necessitates pieces which can directly be industrially manufactured, the operation of which is the same for the user, the putting into service of which allows the conservation of the pinion and disk sets existing on the bicycle, and the cost of which remains within the range of prices of the dérailleurs on the market.

For that purpose, the inventive dérailleur device is characterized in that it is equipped with a front dérailleur, a chain connecting a set of pinions and at least one disk and, if the case may be, a synchronized control limiting the combinations for an adapted chain alignment and for reducing the chain length necessary in the case of several disks, characterized in that it comprises:

- a rotatable base provided with a return spring forcing the so base in anti-clockwise direction
- guiding/dérailleur means fixedly connected to the base, and
- a movable tension plate fixedly connected to the guiding/dérailleur means.

According to a particular embodiment, the movable tension plate comprises a supporting arm, a tension arm mounted pivotable relative to the supporting arm, and a first and a second tension roller mounted freely rotatable on the ends of the tension arm, as well as a spring forcing the tension arm in anti-clockwise direction, whereby the chain passes over the first tension roller and under the second tension roller.

In particular, the tension arm is mounted onto an axis pivoting relative to the supporting arm, and the axis is essentially arranged in the centre of the tension arm or, according to a variant the axis coincides with the rotation axis of the second roller.

According to a further characteristic, the guiding/dérailleur means comprises a deformable parallelogram carrying at its end, immediately downstream of the movable tension plate and in the alignment thereof, a guiding/dérailleur roller mounted freely rotatable, whereby the chain passes over this guiding/dérailleur roller.

An improvement provides that the guiding/dérailleur roller is supported by means for adjusting the translation in the plane of the chain.

Moreover, the guiding/dérailleur roller comprises additional means for lateral guidance such as at least one flange.

In a variant which is particularly advantageous for the fabrication as well as for the user's convenience due to an improvement of the dérailleur quality, connection means interposed between the movable tension plate and the guiding/dérailleur means are provided so as to restrain the tensional stress of the chain and the return stress of the guiding means.

BRIEF DESCRIPTION OF THE DRAWINGS

According to a further improvement, the device comprises a crankcase for enveloping at least the rear dérailleur, the pinions, the disks and the chain.

The invention will be described in the following with respect to the enclosed drawings representing an arrangement according but not limited to a preferred embodiment, the different Figures showing.

DETAILED DESCRIPTION OF PREFERRED EMBODIMENTS OF THE INVENTION

Figure 1:
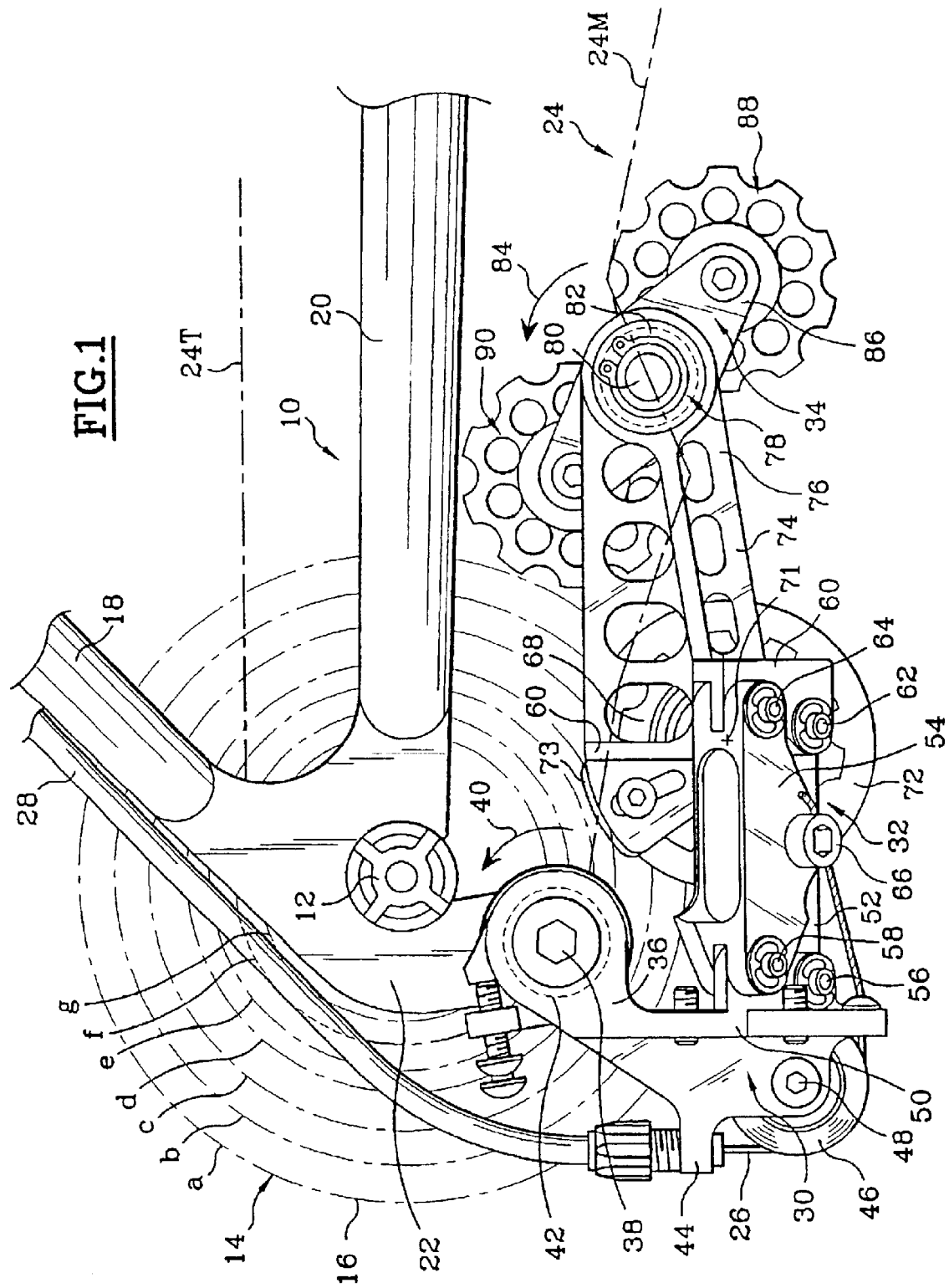
FIG. 1 a side view of the rear dérailleur according to the invention mounted onto a bicycle comprising a set of pinions into which the dérailleur is inserted, FIG. 2 a schematic functional view of the dérailleur in a first position depicting a set of disks with the front dérailleur thereof, FIG. 3 a schematic functional view of the dérailleur identical to the one of FIG. 2 but in a second position, FIG. 4 a view of a realization variant in which the axis of rotation of the plate coincides with the axis of rotation of a roller, FIG. 5 a side view of a realization variant with a return spring for parallel movement and common tension in the case of a pivoting arm with two rollers, and FIG. 6 a view according to a further variant in the case of a movable arm with a single roller.

In FIG. 1, the frame 10 of a bicycle is partially represented with the hub axle 12 equipped with a set 14 of pinions 16, in the present case seven pinions a to q, from the largest to the smallest.

The frame 10 comprises in a known and not limiting manner, two tubes 18 and 20 welded together, these two tubes forming a reception plate 22 of the rear dérailleur according to the invention.

A chain 24 connects the set 14 of rear pinions with the front disks, the chain being symbolized by a dashed line so as to maintain the Figure's necessary clarity.

A control cable of the rear dérailleur has the reference numeral 26 and its sheath 28. The cable issues from a dérailleur control which is not represented since this control is not directly relevant for the present invention.

The dérailleur according to the Invention comprises three essential parts, a base 30 supporting the dérailleur, a deformable guiding/dérailleur parallelogram 32, and a movable tension plate, so as to separate the guiding/dérailleur functions and the tension functions.

The base 30 comprises a body 36 mounted for rotating around an axis 38 and fixed to the reception plate 22 of the frame 10. This body is fetched back in the direction of the arrow 40 by a spring symbolized at 42, i.e. in a direction inverse to that of known types of dérailleurs.

This base 30 is fixed in lateral translation. In this case, it comprises an intermediate plate with adjustment means having stoppers represented by screws in FIG. 1.

On this base is also provided the stopper 44 of sheath 28.

A drive disk 46 mounted freely rotatable around an axis 48 parallel to the pivot axis 38 of the base, receives the cable 26 in its orifice so as to secure a good guidance.

A wing 50 having been manufactured with the base, extends essentially perpendicular to the plane of the base 30, and the wing supports the deformable guiding/dérailleur parallelogram 32.

This parallelogram 32 comprises two arms 52 and 54, a lower and an upper one, articulated, for one, relative to the wing 50 of the base around two axes 56 and 58 and, for another, relative to a guiding piece 60 around two axes 62 and 64. An anchoring means 66 allows the cable 26 to be fixed on the upper arm 54.

The guiding piece 60 hence is translationally movable along a straight line essentially parallel to the generating line of the virtual circular cone formed by the set of pinions due to the deformable parallelogram, which is the case with known dérailleurs.

Figure 2:
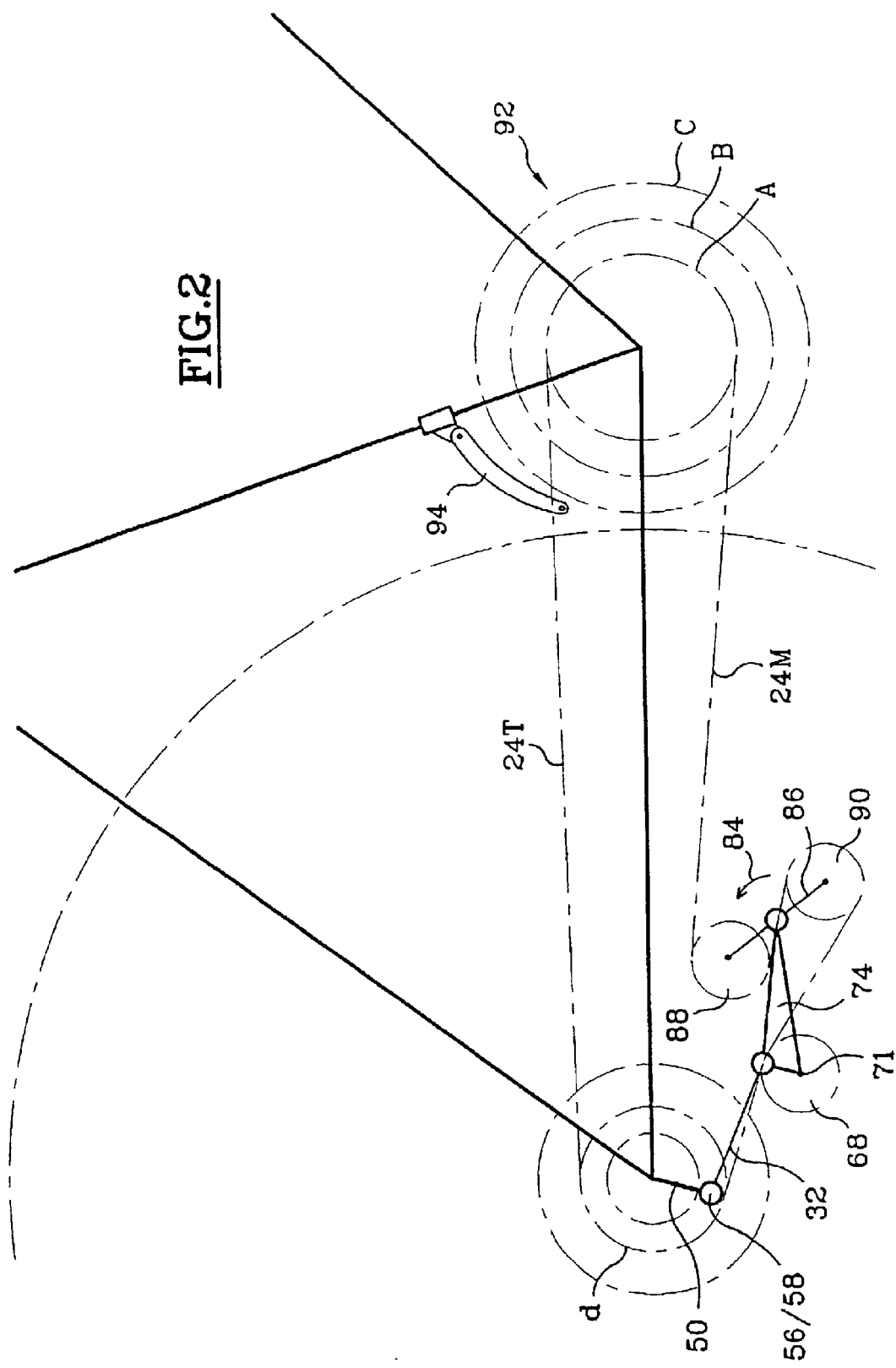
Figure 3:
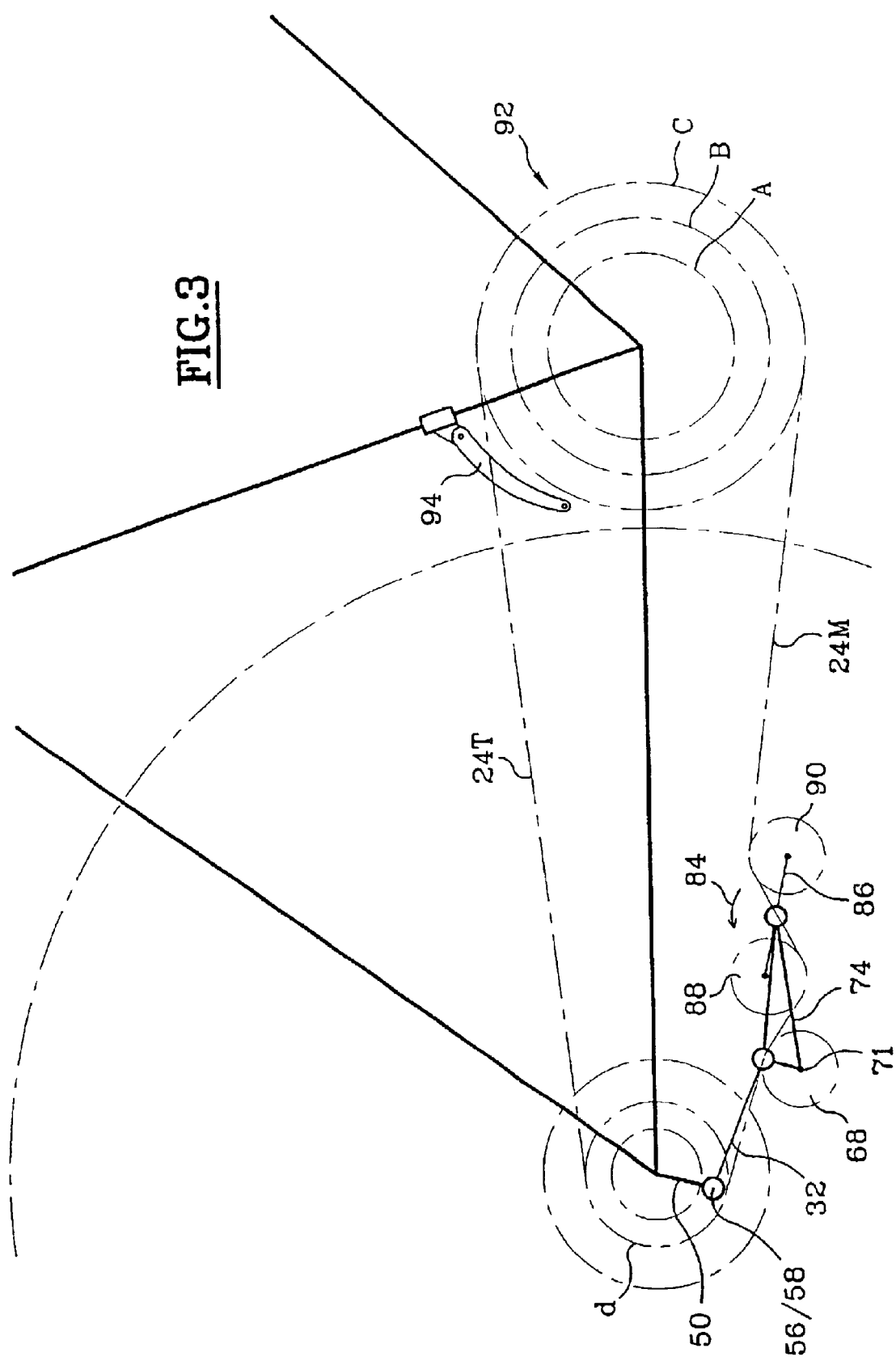

This guiding piece 60 comprises a guiding/dérailleur roller 68 mounted freely rotatable around an axis 71, which can only be seen in FIGS. 2 and 3.

Preferably, a complementary lateral guiding/dérailleur means, such as a lateral flange 72, is associated with this guiding/dérailleur roller arranged on the same axis 71, so that the plane of the flange is parallel to the plane of the guiding/dérailleur roller.

The unit of the guiding/dérailleur roller 68 and of its flange 72 is translationally adjustable in the plane defined by the chain by means of the active pinion of the set of pinions and by means of the active disk of the set of disks, so that the unit can be disposed as close as possible to the pinions and in particular in the best position for allowing a good dérailleur action.

Figure 4:
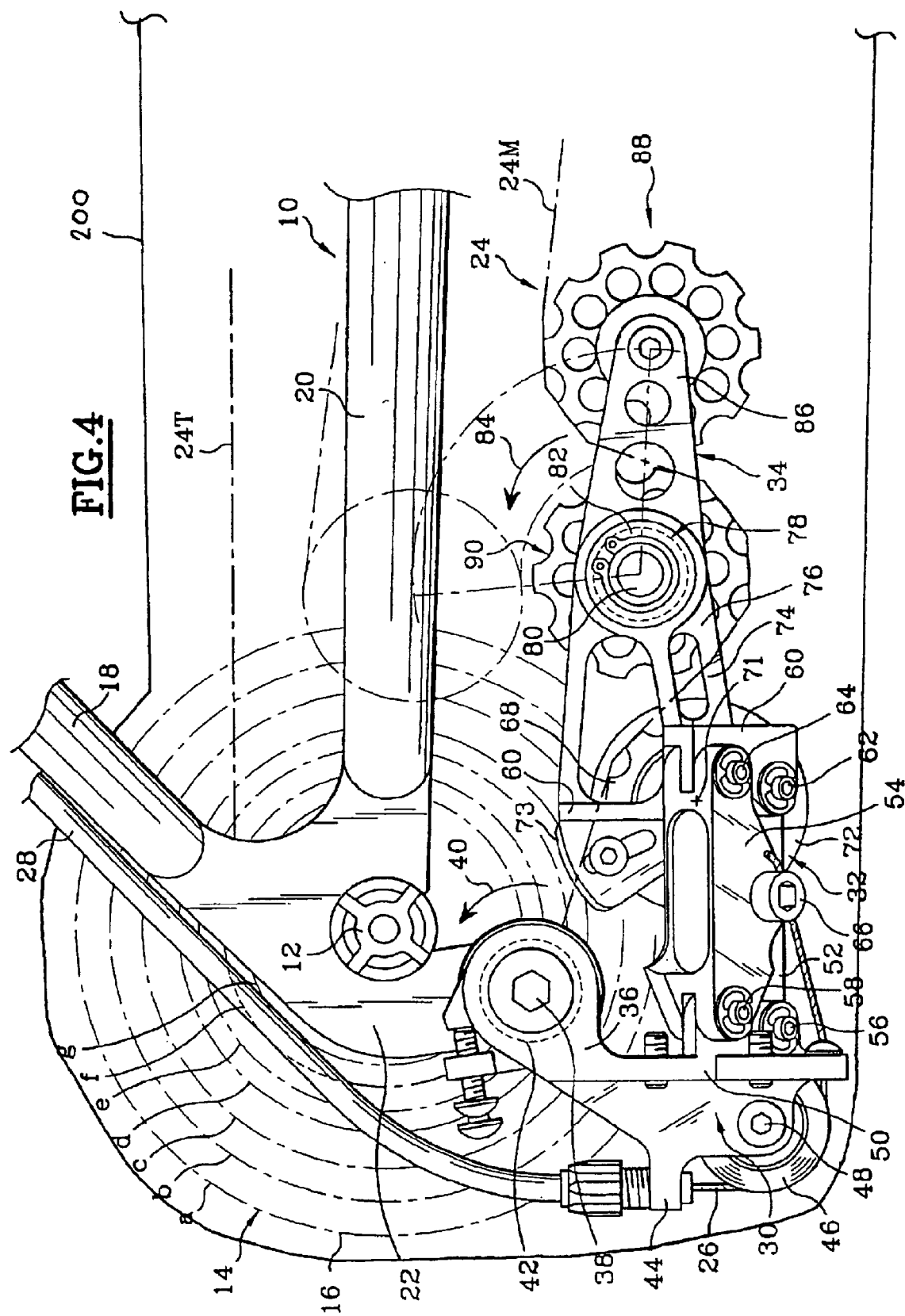

In the FIGS. 1 and 4, a complementary lateral pression means is provided. In the illustrated embodiment, the complementary lateral pression means is provided as a lateral pression dérailleur flange 73 disposed essentially adjacent flange 72 of the guiding/dérailleur roller 68 such that the chain 24 passes between the flanges 72 and 73 as it rides over the guiding/dérailleur roller 68. The position of flange 73 is translationally-variable along a line connecting the rotation axis 12 with the rotation axis 71 of the roller 68 so as to be as close as possible to the virtual cone constituted by the pinions.

The guiding piece 60 prolongs towards the front of the bicycle by a supporting arm 74.

The end 76 of this arm carries a bearing 78 in which an axis 80 fixedly connected to the plate 34 turns rotatably. A spring 82, represented by dashes, ensures the return in the direction of the arrow 84.

The movable tension plate 34 comprises a tension arm 86, which is the fixed member of the axis 80. The pivot point is essentially the centre of the arm of the embodiment illustrated in FIG. 1. One recognizes that the movable arm 86 has a length reduced relative to the length of the different pieces such as the deformable parallelogram or the supporting arm.

At each of the two ends of this tension arm 86, a tension roller 88, 90, respectively a first and a second tension roller, is arranged mounted freely rotatable.

One recognizes the passage of the chain 24 over the first tension roller 88, under the second tension roller 90, over the guiding/dérailleur roller 68 before guiding flange 72, behind lateral pression flange 73 and under the corresponding pinion of the set 14 of pinions 16.

For the description of the function mode, the chain strands under tension and not under tension of the chain 24 have been marked with the reference numeral 24T, respectively 24M.

For the following description of the function mode of the dérailleur according to the invention, reference is to be made to all of the FIGS. 1, 2 and 3 at the same time.

Of course, only certain disk/pinion pairs are preferably susceptible to maintaining an optimum chain alignment, and that extreme combinations such as: small pinion g and small disk or large pinion a and large disk are preferably excluded for an application of the device according to the invention with the best performance.

In FIG. 2, the chain 24 is on the small disk A of the three disks A, B and C of the set of disks 92 with its front dérailleur carrying the reference numeral 94, and on the fourth pinion d. This position corresponds essentially to the longest chain length to be recuperated, since the retained disk/pinion combination corresponds to the smallest peripheral length among the preferably susceptible combinations.

In this position, the chain strand 24M not under tension is guided by the roller 68, which is put onto the chain 24, since the base 30 is fetched back by the spring 42 in the direction of the arrow 40.

The guiding/dérailleur roller 68 is exactly in the plane of the corresponding pinion d.

The movable plate 34 ensures the tension and the taking up of the length of chain which is not used. For this purpose, the arm 86 has pivoted in the direction of the arrow 84 into its extreme position, the first roller 88 being up and the second roller 90 being down. The chain passage hence follows a substantially serpentine path in the shape of a sharp or pronounced "S"-curve (see FIG. 2, path of chain 24 around rollers 88 and 90), such that the path of the chain around the first and second rollers 88 and 90 is in the shape of the letter "S". With the arm 86 pivoted as described in this paragraph and shown in FIG. 2, the path of the chain around the respective rollers 88 and 90 is as long as possible because the rollers 88 and 90 are positioned to take up the maximum possible amount of chain slack.

One states that there is a large ground clearance as compared to an arrangement according to prior art.

In FIG. 3, due to the front dérailleur, the user has brought the chain onto the disk C having the largest diameter in combination with the same pinion d, which, for the depicted function mode and the retained combinations, corresponds to the shortest chain length to be taken up.

With the chain in this configuration, the tension arm 86, is rotated or pivoted in a direction opposite that produced by the return spring 82, such that the tension arm 86 is then carried into a position in which the pathway of the chain around the first and second rollers 88 and 90 follows a relaxed "S"-curve (see FIG. 3, path of chain 24 around rollers 88 and 90) i.e. the path of the chain around the first and second rollers 88 and 90 follows a serpentine path that loosely resembles a letter "S", but which is a quasi linear. In other words, with the arm 86 pivoted as described in this paragraph and shown in FIG. 3, the path of the chain around the respective rollers 88 and 90 is as short as possible because the rollers 88 and 90 are positioned to take up a minimum amount of chain slack, so the path of the chain through the rollers 88 and 90 is nearly linear or as linear as possible. However, the chain path inevitably still exhibits some S-shaped curvature as a result of being carried over the rollers 88 and 90, which is what is meant by relaxed "S"-curve.

One recognizes that the re-adjustment is calculated for the highest chain consumption and that, in this position, one could say that the dérailleur according to the invention does not produce any unnecessary chain consumption.

With the tension arm 86 pivoted as described in the preceding two Paragraphs, the ground clearance for the rollers 88 and 90 is even more improved than when the tension arm 86 is pivoted into its extreme position in the direction of arrow 84 in FIG. 2 as described above Moreover, the ground clearance of the rollers 88 and 90 is considerably improved for all positions of the tension arm 86 compared to conventional dérailleur systems because the dérailleur (including tension arm 86 and rollers 88 and 90) is positioned in a space which essentially corresponds to the space required by the disks, whereby the ground clearance cannot be reduced. In other words, the ground clearance for the rollers 88 and 90, in all degrees of rotation of the tension arm 86, is about the same (or at least as good as) that of the disks A, B and C. It is understood by persons of ordinary skill in the dérailleur art that the ground clearance of a component refers to the distance from that component to the ground on which the bicycle is resting or being ridden. Obviously, the greater the around clearance, the lesser the chance of fouling of the component from ground-based debris, or of contacting the ground while maneuvering the bicycle. This means 'improved' ground clearance refers to a greater distance between the component and the ground, whereas decreased ground clearance would mean less distance between the component and the ground.

According to the present invention, it is also possible to provide a variant with a simplification of the arrangement of the return springs.

A return spring is namely generally provided interposed between the two arms 52 and 54 of the deformable parallelogram so as to widen up the parallelogram and to guide the chain of the largest pinion a towards the smallest pinion g, said spring being then compressed by the force exercised by the user via the cable 26. It occurs rather often that the return force is insufficient for securing a free and efficient dérailleur action. Moreover, the force to be exercised on the cable is important, which fact can necessitate additional reductions.

In the case of the present invention, it is also possible to combine the two actions of the return springs of the parallelogram and the movable tension plate for diminishing the respective forces produced while maintaining the capacity of each of them to ensure efficient returns.

Figure 5:
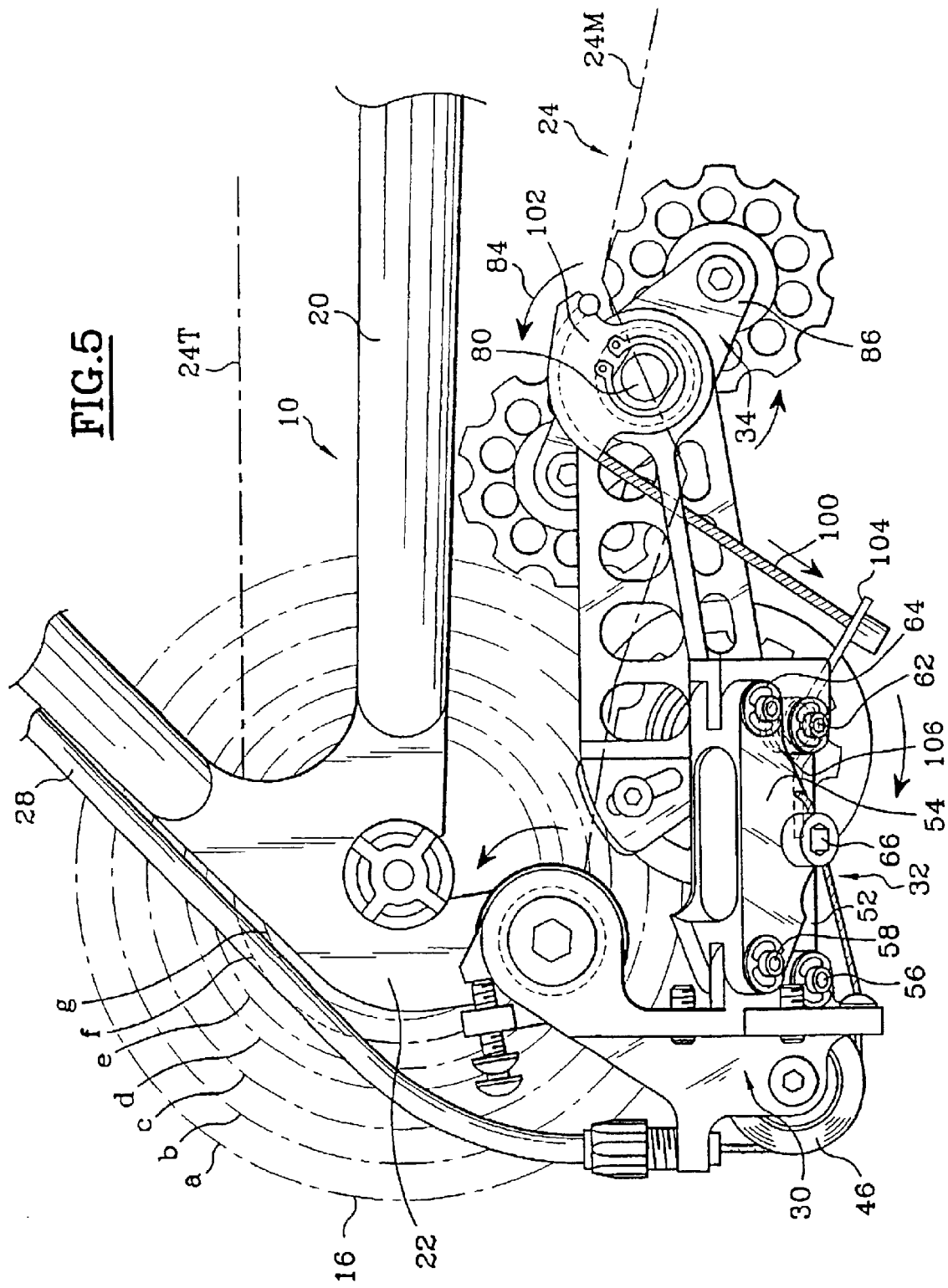

Thus,one has connected in FIG. 5, which corresponds to the embodiment of FIG. 1 with the same reference numerals for identical elements, a sector 102 of the roller fixed to the axis 80 supporting the tension arm 86 by means of a cable 100, with one end 104 of the return spring 106 of the deformable parallelogram of the guiding/dérailleur means.

The sector 102 of the roller is so configured that the cable passes over it and ensures a rotation in the direction of the arrow 84 when a traction is exercised on cable 100.

The spring 106 is wound up so as to allow an interaction between the force resulting from the tension of the chain and the force which is necessary for the return of the parallelogram.

The action of the chain tension thus is obtained totally or partially by the reaction of the parallelogram return spring 106. It is namely possible to suppress the return spring 82 or to maintain it in certain cases, however, by modifying its force which has to be very limited.

Figure 6:
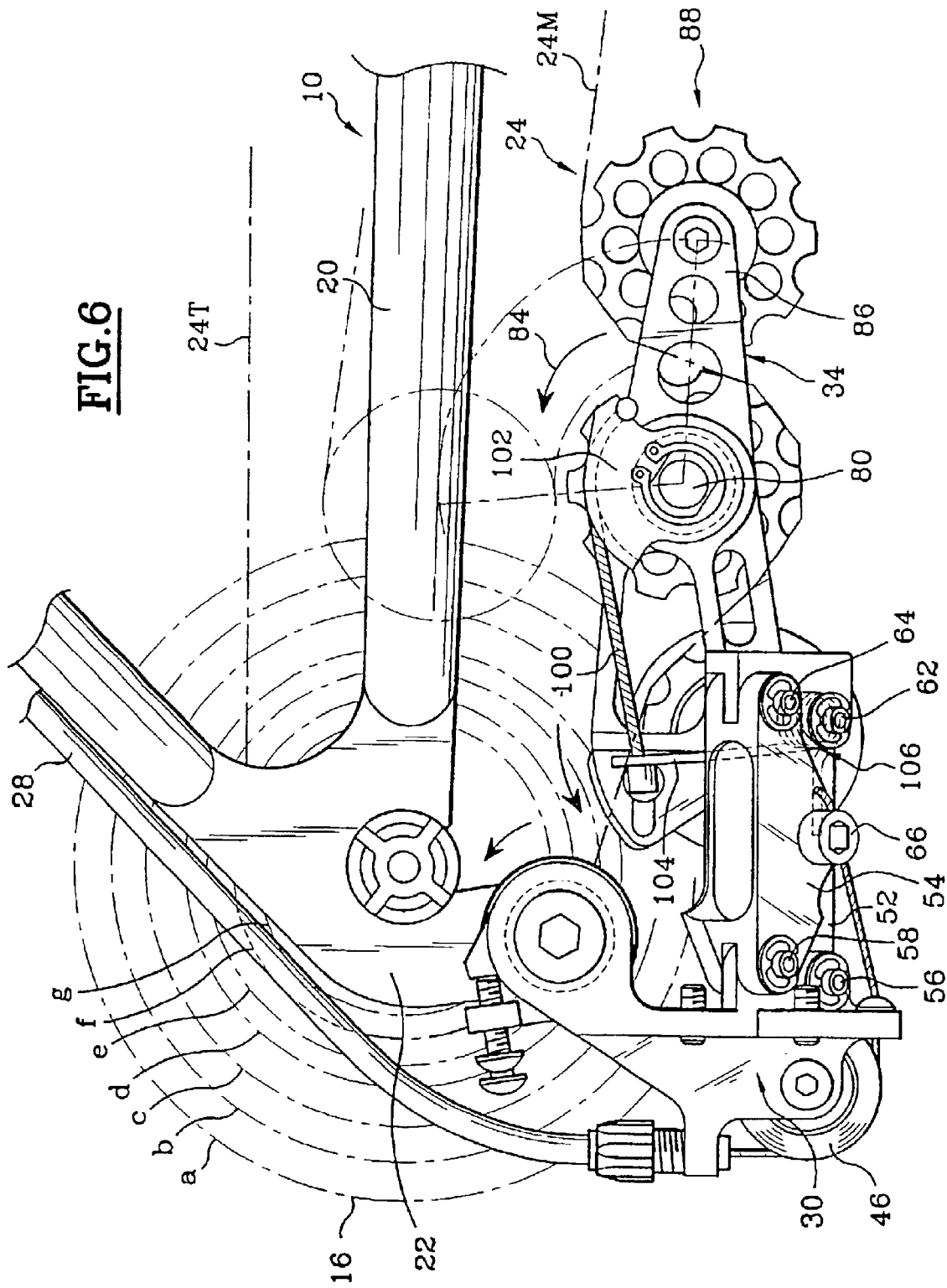

In the case represented in FIG. 6, the same is true for the winding-up direction near the return spring 106. For obtaining the desired action, one namely has to provide an inverse direction of winding up. This variant corresponds to the embodiment of FIG. 4.

Mounting the base on a rotation axis with a return spring is essentially provided in the main embodiment so as to allow the disassembly of the rear wheel. However, it is also quite possible to provide it fixedly,in particular when the frame only comprises a single arm or means for a disassembly from behind.

It is also possible to configure the position of the rotation axis 80 of the tension plate variable, and in FIG. 4 one recognizes that this axis can assume an extreme position in which said axis 80 coincides with the rotation axis of the second roller 90.

One can also replace the deformable parallelogram indicated in the main embodiment by any suitable means allowing for the replacement of the chain essentially parallel to a generating line of the virtual cone determined by the set of pinions.

The dérailleur according to the invention allows for arranging the entire dérailleur device comprising the two dérailleurs, front and rear, as well as the chain in a sealed case, such as a crankcase 200 (see FIG. 4), which fact prevents the mechanism and the pinions from being affected, and leads to a reduced maintenance, to a higher reliability and to a better performance due to an appropriate and continuous lubrication.

What is claimed is:

1. Rear dérailleur device, for a bicycle equipped with a bicycle chain and a set of rear pinions, comprising a rotatable base provided with a return spring forcing said base in an anticlockwise direction, guiding/dérailleur means fixedly connected with said base, a movable tension plate pivotally connected with the guiding/dérailleur means, and a guiding/dérailleur roller in alignment with the moveable tension plate, said guiding/dérailleur roller being mounted freely rotatable in a position immediately downstream of the tension plate relative to a path and direction of travel of said chain, wherein the chain passes over the guiding/dérailleur roller, and wherein the guiding/dérailleur roller is supported in the plane of the chain by translation adjustment means.

2. Dérailleur device according to claim 1, wherein the movable tension plate comprises a supporting arm, a tension arm mounted pivoting relative to said supporting arm, and a first and a second tension roller mounted rotatably at the ends of the tension arm, as well as a spring forcing the tension arm in the anti-clockwise direction, the chain passing over the first tension roller and under the second tension roller.

3. Dérailleur device according to claim 2, wherein the tension arm is mounted on an axis pivoting relative to the supporting arm, said axis being disposed essentially in the centre of said tension arm.

4. Dérailleur device according to claim 2, wherein the tension arm is mounted on an axis pivoting relative to the supporting arm, said axis coinciding with the rotation axis of the second roller.

5. Dérailleur device according to claim 1, wherein the guiding/dérailleur roller has complementary lateral guiding/dérailleur means associated therewith.

6. Dérailleur device according to claim 5, said complementary lateral guiding/dérailleur means comprising at least one flange.

7. Dérailleur device according to claim 1, wherein the guiding/dérailleur roller has complementary lateral pression means associated therewith.

8. Dérailleur device according to claim 7, said complementary lateral pression means comprising at least one lateral pression flange.

9. Dédevice according to claim 8, wherein the lateral pression flange is mounted translationally variable.

10. Dérailleur device according to claim 1, further comprising a crankcase for enveloping at least the rear dérailleur device, the pinions, and the chain.

11. Dérailleur device according to claim 1, said dérailleur device being located in a vertical position that provides substantially the same or better ground clearance relative to said set of rear pinions.

12. Dérailleur device according to claim 1, said dérailleur device being located in a vertical position that provides substantially the same or better ground clearance relative to a set of disks associated with a front dérailleur of said bicycle.

13. Rear dérailleur device, for a bicycle equipped with a bicycle chain and a set of rear pinions, comprising a rotatable base provided with a return spring forcing said base in an anticlockwise direction, guiding/dérailleur means fixedly connected with said base, a movable tension plate pivotally connected with the guiding/dérailleur means, and connection means interposed between the movable tension plate and the guiding/dérailleur means so as to restrain tensional stress of the chain and return forces of the guiding/dérailleur means.

14. Dérailleur device according to claim 13, said guiding/dérailleur means comprising a deformable parallelogram effective to adjust the lateral position of said chain relative to said set of rear pinions, wherein the connection means comprise a cable which co-operates with a roller sector attached to said movable tension plate, and with a return spring of the deformable parallelogram of the guiding/dérailleur means.

* * * * *

UNITED STATES PATENT AND TRADEMARK OFFICE
CERTIFICATE OF CORRECTION

PATENT NO.    : 6,793,598 B1
DATED         : September 21, 2004
INVENTOR(S)   : Franck Savard It is certified that error appears in the above-identified patent and that said Letters Patent is hereby corrected as shown below:

Title page,
Item [75], Inventor, after "Franck Savard", please delete "Osaka (JP)" and insert therefor -- Planguenoual (FR) --.

Column 6,
Line 4, please delete "anticlockwise" and insert therefor -- anti-clockwise --.

Column 7,
Line 1, please delete "Dédevice" and insert therefor -- Dérailleur device --.

Column 8,
Line 4, please delete "anticlockwise" and insert therefor -- anti-clockwise --.

Signed and Sealed this

Nineteenth Day of July, 2005

JON W. DUDAS
*Director of the United States Patent and Trademark Office*